E. K. Shepard,

Railway Rail.

No. 3302. Reissued Feb. 16. 1869.

Witnessed:
Alex. Mahon
H. H. Doubleday

Payne Pettebone.
Joseph E. Patterson.
Aaron W. Brown
per
A. W. Smith
attorney

UNITED STATES PATENT OFFICE.

PAYNE PETTEBONE, OF WYOMING, AND J. E. PATTERSON AND A. W. BROWN, OF WILKES-BARRÉ, ASSIGNEES OF EDWIN R. SHEPARD, OF SCRANTON, PENNSYLVANIA.

IMPROVED RAIL FOR RAILWAYS.

Specification forming part of Letters Patent No. 75,206, dated March 3, 1868; Reissue No. 3,302, dated February 16, 1869.

*To all whom it may concern:*

Be it known that EDWIN R. SHEPARD, of the city of Scranton, county of Luzerne, and State of Pennsylvania, did invent certain Improvements in Rails for Railroads, of which the following is a full, clear, and exact description, reference being had to the accompanying drawings, in which—

Figure 1:
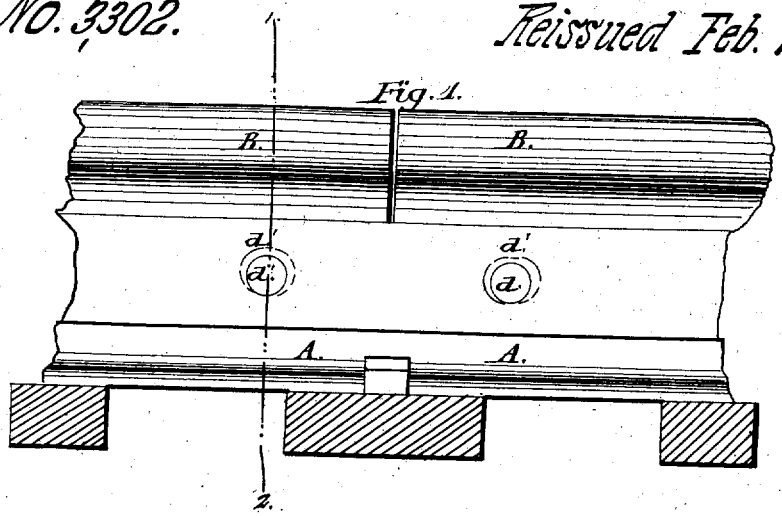
Figure 3:
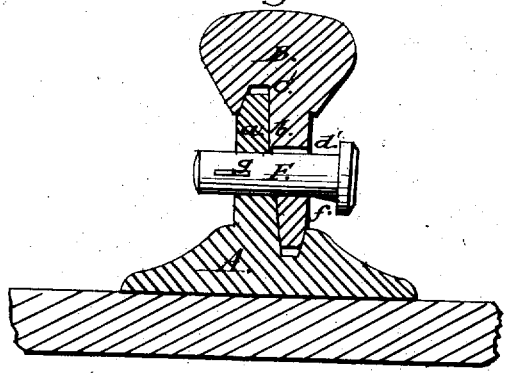
Figure 2:
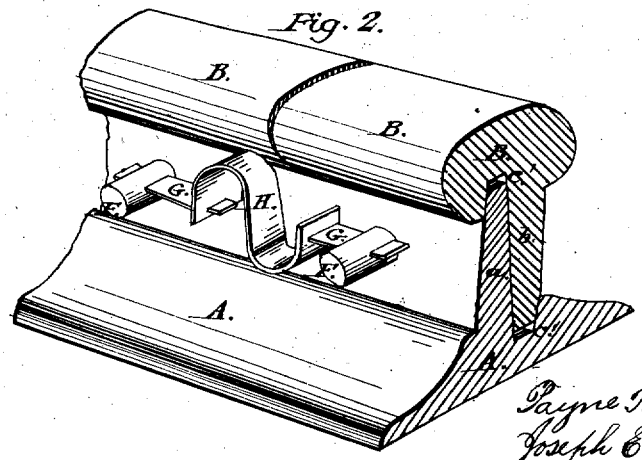

Figure 1 is a side view of a portion of the rail. Fig. 2 is a sectional perspective view, and Fig. 3 is a transverse section on the line 1 2, Fig. 1.

The causes of failure among compound rails are various, but the principal one is this: There had been no provision made for self-adjustment between the upper and lower parts of the rail as their bearing-surface became worn, and, what was of more consequence, the devices by which the parts composing the rail were held together were not constructed so as to take up the "slack" produced by the rail becoming seated one part to another.

In using compound rails it has been found that, owing to the unequal temperature of the different parts when being rolled, and the fact that they became slightly warped from various causes, they cannot be accurately fitted to each other when first laid; but upon heavy trains being run over them they are sprung and swaged until each part becomes perfectly adjusted to its corresponding part; but in accomplishing this adjustment the upper part has been depressed a little relatively to the lower part of the base, and there having been no provision made for taking up this slack, there is a little looseness, the result of which is that the rail is rapidly pounded out and destroyed, as it will be readily seen that if the upper portion be loose when a wheel is rolled quickly upon it, said upper part is forced down on the lower part, producing a blow or concussion, which is not the case when the two parts are held firmly together. As yet we have considered only the effect of the rapidly-inflicted vertical pressure, for it is not a blow or stroke, unless the rails are loose, as any one will be convinced by observing the difference in its effect upon the ends of the rails, where they are loose in the chairs, and upon the middle of the rail; but there is another item to be provided for, which is the lateral blow imparted to the rail by the flanges of the wheels as the cars sway back and forth. This occasions a constant and unavoidable wear upon the surface of the ribs, which are in contact with each other or with the grooves in which they are confined, and although, perhaps, not so injurious to the rail itself, is very destructive to the bolt-work, because it transfers to it (the bolt-work) the strain intended to have been borne by the ribs and grooves. The construction which he has invented to overcome these defects will be best understood from the following description of the rail:

The lower portion or base, A, has a rib, *a*, beveled on the outside of its upper edge. It is provided with a groove, *c*, and also with round or square perforations, *d*, Fig. 1. The upper portion or head, B, has a rib, *b*, also beveled upon one edge, and a groove, *c'*. Through the rib *b* are perforations or slots *d'*, elongated horizontally, with the lower surface made flat to correspond with the flat side of the key, hereinafter described. This slot is also of greater diameter vertically than the perforations in the base. The grooves in both head and base have a pitch exactly corresponding to the beveled edges of the rib, but are made deeper than the beveled part of the rib, and therefore narrower at the bottom than the edge of the rib is, as shown in Figs 2 and 3. Consequently the ribs do not find a horizontal face-bearing, but rest wholly on the sides of the grooves, and, as they become worn, settle down farther into the grooves, thereby taking up the slack, avoiding rattling and undue strain upon the bolt-work. This is a feature in the construction of the rail itself which is new.

It is apparent that no change in the form of the rail itself can guard against both vertical and lateral motion, so it becomes necessary to use a device for preventing any upward motion of the head relative to the base. The rail should be laid with the joints of the head portion midway, or thereabouts, between the joints in the base, the slots having been punched so as to match, care being taken that when the rail is laid the bottom of both slots shall be on the same line. Then insert a key, F. This key is provided at one end with an incline or wedge, *f*, and at the other end with a slot, *g*, and key G, operated by a spring, H, Fig. 3. The key F can only be inserted until the incline *f* reaches, or, perhaps, barely enters, the slot in the rib *b*; but as the head is forced down by the weight of passing trains, the key F being drawn in by the key G and spring H, said head cannot recoil; hence there is no opportunity for the next wheel to produce a concussion between the parts, and the ordinary "brooming up" of the ends of rails, the displacement, loosening, and destruction of the bolt-work, as well as of the body of the rails themselves, are prevented.

Having thus described the construction and operation of the rail, what is claimed as the invention of said E. R. SHEPARD is—

1. The construction of a compound railroad-rail composed of two parts—an upper or head portion having a vertical rib, and a lower or base portion having also a vertical rib—in such manner that the wear of such parts of the upper or lower portion, or both, as bear on each other, shall be compensated for and all lateral motion of the parts prevented, substantially as set forth.

2. In combination with a compound railroad-rail, an automatic device adapted to prevent an upward motion of the head or upper portion relative to the base or lower portion of said rail.

3. In combination with a compound railroad-rail, a key or bolt provided with an inclined or wedging face, for following the movement of the upper portion when it is depressed and preventing it from being retracted.

PAYNE PETTEBONE.
J. E. PATTERSON.
A. W. BROWN.

Witnesses to Payne Pettebone:
HENRY WOODHOUSE,
NETTIE N. WOODHOUSE.

Witnesses to J. E. Patterson and A. W. Brown:
O. J. HARVEY,
CLINTON VAN HORN.